Nov. 6, 1934.   J. F. WAIT   1,980,119
COMPOSITION OF MATTER AND PROCESS OF PRODUCING THE SAME
Filed Nov. 5, 1929
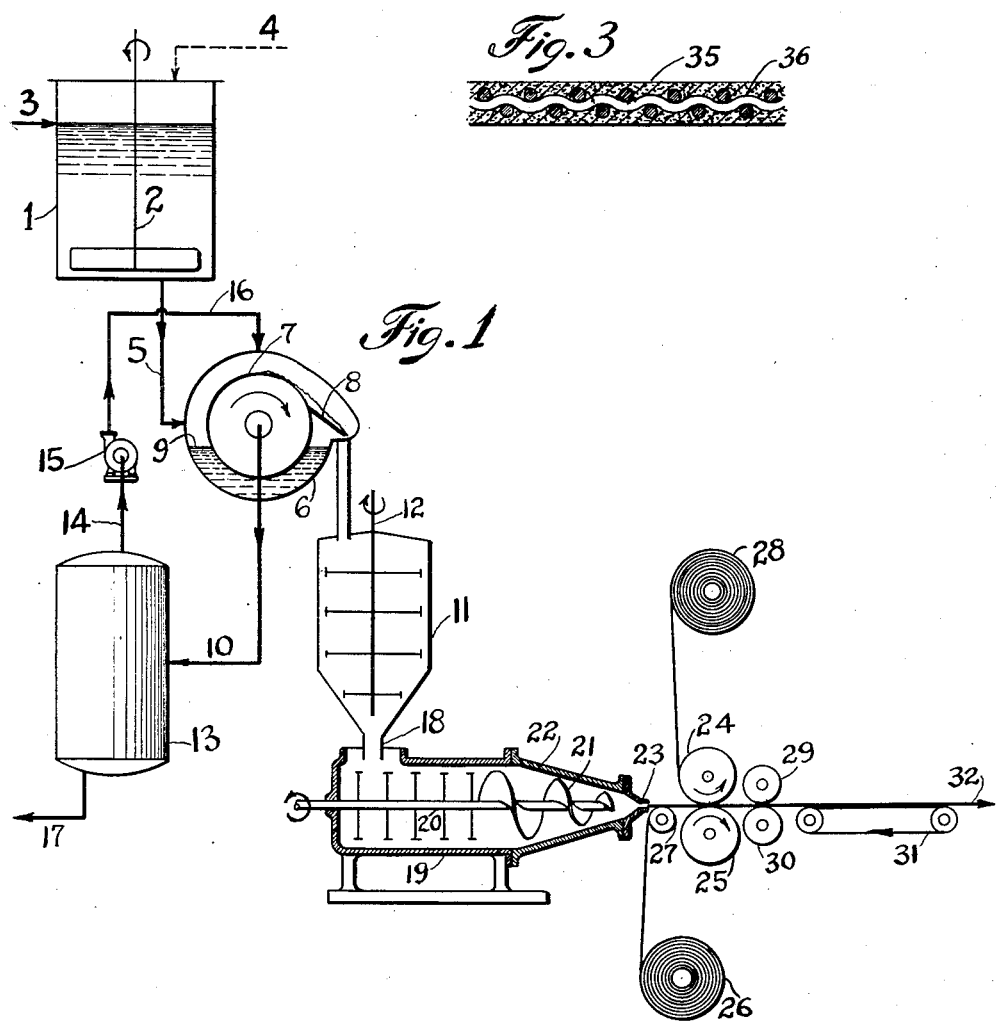

Patented Nov. 6, 1934

1,980,119

UNITED STATES PATENT OFFICE 1,980,119

COMPOSITION OF MATTER AND PROCESS OF PRODUCING THE SAME

Justin F. Wait, Bronx, N. Y.

Application November 5, 1929, Serial No. 405,004

20 Claims. (Cl. 106—24)

This invention relates to improvements in methods of manufacturing composition products, involving an oil base, a colloidal nonmetallic mineral and a filler such as may be used for floor covering and building material. It also relates to methods of purifying oils, including vegetable, animal and mineral oils in such a manner that a by-product is formed which is suitable for the manufacture of the composition product.

Oils usually contain impurities in both colloidal and true solution. They alter the properties of the oil and usually cause color and a dull appearance. I have found that by treating such oils with a highly dispersed adsorptive nonmetallic mineral the quality is greatly improved upon separation as by filtration. The cake-like residue in a process of this sort has heretofore been wasted or in some instances treated to recover the residual oil and/or the mineral which is then used over again in the same or similar process. My invention involves the use of the residue to produce a composition product of decided commercial value.

An oil which is of a type which will naturally dry and partially harden under the process conditions, or an oil which may be treated to thus partially dry or harden it can be so treated by this invention with excellent results. An additional substance such as a rubber-like product is sometimes used with or as a substitute for the oil.

These composition products may be made up with a fibrous backing or reinforcement over or about which is deposited a mixture of the residual oily substance with its highly dispersed adsorptive mineral. A filler of a fibrous structure may also be mixed therewith.

The fineness of the particles makes it possible to so impregnate porous material such as a woven fabric or felt. This gives a mixture of an oil and a nonmetallic mineral in the pores and on the face of the porous material. The process may then be operated to give a rigid or a flexible final product as desired and in conformity with required control features necessary to give the proper hardening to the oil or oil-derived component so that it will be accordingly rigid or flexible when compounded or built up in the manner hereof. Various combinations of two or more layers of material like felt, fabric or paper may be used to build up a laminated composition product suitable for use for containers, building material and other purposes.

One of the features of this invention is the fact that the size of the particles of the highly dispersed nonmetallic mineral is so small that they have a very high specific surface, the size being comparable with the size of pores or openings of a porous surface. The particles need not be such that they form a colloidal suspension in the oil treated if by pressing or other action the particles may be "sheared" or at least temporarily broken up so that they can be impregnated into a porous surface or into the pores of a filler having a fibrous structure. In this respect they differ materially from the common rigid particles of larger dimension which cannot be so treated and which merely contact with the outside of porous surfaces and do not actually flow into the same.

A nonmetallic mineral which will form a colloidal solution in water under proper conditions will seldom form such a solution in a light oil, however, this is generally due, in part, to difference in specific gravity if not almost entirely to the fact that particles have agglomerated to the extent of contacting but not actually growing together as is the case in the formation of a true crystalloid. Since the particles merely contact with one another and are perhaps held close to one another by "gravimetric" forces they are easily moved or "sheared" with reference to one another. The energy required to so move them is slight if the individual particles are merely "rolled" over one another in such movement.

By the highly dispersed condition of the nonmetallic substances referred to herein is meant a state of subdivision wherein the diametrical dimensions is below about one two-thousandths of an inch as compared with ordinary crystalloids or their equivalent in form which almost invariably have a diametrical dimension considerably in excess of this figure. For example, it is common to treat vegetable and other oils with a nonmetallic mineral of a diametrical dimension between one-thirtieth and one three-hundredth of an inch.

It is realized that it is impractical to produce and/or maintain a mass of a substance wherein all of the particles are of the same size. It is my intention to designate the size of the particles of a substance as approximately the average size or the size most nearly that of the greater portion of the particles.

Many animal and other oils, which are cooled, evaporated or otherwise treated to cause supersaturation in contact with such a highly dispersed nonmetallic mineral, yield certain insoluble or immiscible products and usually with speed at a temperature appreciably above that at which they would otherwise be deposited. The resulting residual oil is fairly firm and quite suitable for forming a composition product. This phase of the invention should not be confused with the process using finely divided particles which are in effect true crystalloids and which do not even approach the size of particles used in my process.

Another feature of this invention is that of wetting the particles with a product miscible with the oil being treated in a manner whereby air, moisture and other particles otherwise wetting the tiny "pores" of the colloidal would normally or otherwise prevent proper adsorption. High vacuum and/or heat may be applied to reduce the quantity of air, moisture or other undesirable substance. This and some of the other phases of the procedure may be more readily understood by reference to my Patent No. 1,930,572. While the processes are described as being used to purify a liquid, they are likewise intended to cover separation of a desired product from a liquid when by so doing the proportion of said product in said liquid is decreased by applying the process.

By highly dispersed adsorptive mineral is meant a product which is made up of groups of particles in very fine form, which when mixed with a suitable liquid will quickly disperse and can be easily put into a colloidal condition therewith. It need not necessarily be dispersed to a colloidal form with reference to the oil being treated. Some silicious bodies such as some bentonites and commercial products such as certain forms of silica gel and the trade product "Barbourite", which is a clay-like substance with very finely divided particles, are of this class.

The invention may be carried out in the apparatus illustrated in the accompanying drawing in which Fig. 1 is a side vew of the apparatus partly in section and Figs. 2 and 3 are sections through forms of the final product. A mixing tank 1 with an agitator 2 receives oil through the inlet 3, and adsorptive mineral as shown at 4. After agitation for the required period at the desired temperature the mass is charged through the pipe line 5 into the casing 6 of an enclosed continuous filter. The drum 7 is rotated clockwise and carries a filter cloth and by filtration receives filter cake which is discharged over the scraper 8. The liquid level 9 is maintained as desired.

The filtrate of clarified oil is discharged through the outlet 10 and the filter cake into the hopper 11. The agitator 12 may be used in the hopper 11 to keep the filter cake uniform so that successive portions, which may vary in composition are mixed into an approximately uniform mass which makes it possible to easily control subsequent steps of the process. By allowing a small amount of wash liquid to penetrate the cake, the filtrate is kept pure and a wash liquid may be used to help form a composition product. Apparatus and methods for filtering in such manner are shown in my Patents 1,512,321; 1,667,465; and 1,693,417 and others are known or may be devised to suit the circumstances.

The filtrate passes through the pipe 10 into the receiver 13, with the accompanying vapors or gaseous substances and is separated therefrom and discharged through the outlet 17. The gaseous phase may be recirculated through the pipe 14 by means of the pump 15 and the filter chamber inlet 16. The introduction of a wash liquid or steam in a manner to penetrate the filter cake will remove some of its contained oil. Steam distillation of the filter cake may be employed to remove the matter most easily volatilized and in general render the residual oil in the filter cake more suitable for forming a composition product.

The residual cake is discharged through the outlet 18 into a mixing chamber 19 containing the agitator 20. A fibrous or other material may be introduced into the hopper 19 as a filler and mixed by means of the agitator 20 with the cake residue. The fibrous or other material is preferably selected in accord with what is locally available at low price and to yield desired final structure. Some forms of a hardening agent or oxidizing oils may also be introduced in this manner, when desired. Such substances are generally known and the selection from available ones may be made in accord with experimentals in view of desired final qualities. The product may be slightly viscous at elevated temperatures.

The contents of the chamber 19 may be extruded by means of a tapering screw 21 working in a conically shaped outlet 22. The die at 23 controls the thickness and size of the extruded product.

The particular process illustrated introduces the composition product as a middle layer between two porous surfaces such as felt, fabric or paper which are passed, with the composition product, between the rolls 24 and 25. These rolls are preferably heated for most composition products. Electric heat or steam may be used.

The heat and/or pressure causes the residual cake to impregnate the porous fabric that is fed over the rolls 24 and 25 along opposite sides of the extruded composition product. A secondary or other pairs of rolls such as 29 and 30 may be used to impart other pressures and/or temperatures. Rolls so used frequently act as a hardening means. The sheet, which may be used as a wall board or for other purposes, produced as described may then be carried on a conveyor 31 to the discharge 32 after which it is cut into desired lengths as desired. Flexible material such as is used for lining walls and roofs of buildings may be rolled up into rolls for convenience in handling and shipping.

One form of the product produced as described above is as shown in section in Fig. 2, wherein the two porous surfaces 33 and 34 are approximately parallel. The composition product 35 is between the surfaces 33 and 34 and impressed into the same thus adhering to and by reason of the fineness of the particles penetrating into them. The oily nature of the inside layer 35 imparts a waterproofing effect. The hardening step assists in promoting adhesion of the composition product to the porous surface and also increases the cohesion of its particles.

If the porous surfaces are omitted and a metallic or other woven fabric is used, the composition product illustrated in Fig. 3 will be obtained. This product may be formed as by using ozone in the mixing chamber 19 to "gelatinize" the mixture. The screen 36 may be fed from the roll 26. The pressure applied by the rolls 24, 25, 29 and 30 distributes the composition product 35 through the screen 36, the screen becoming enveloped by the composition product. Two metallic belts may be used to help form the product in which case they would pass over 24 and 25 and/or 29 and 30 and return over external idlers (not shown).

As an alternate method of operating, a mixture of residual oil and nonmetallic mineral may be mixed with a solvent in the vessel 1. A portion of the mixture may be dissolved and separated from the mixture in the filter 6. The discharge from pipe 17 may be distilled or refrigerated to effect a complete or partial separation, the recovered solvent being returned to the inlet 3.

Besides the use of ozone as a hardening agent, the hardening may be accomplished by the use of an elevated temperature and an oxygen containing gas or by evaporation produced by heat or under a vacuum. It has also been found that ultraviolet and other rays from sunlight assist in hardening some oils. The hardening may also be accomplished by adding metallic oxides and mixing the same with the mass.

While the process as described is primarily for use with oils, it may likewise be applied to some other liquids. The expression "oil" as used herein is limited to an oil which may be purified or improved in some quality by treatment with a finely divided nonmetallic mineral and wherein such impurities may be separated from such oil by the same operation that separates the mineral during the treatment.

Non-oily liquids such as water and alcohols can also sometimes be processed in a similar way to form useful composition products. In aqueous solution for example the residual mixture may be hardened as by the formation of crystals within its mass. These would sometimes contain water of crystallization in the composition product either in its intermediate or final form. The expression "oil" may thus be interpreted in these exceptional cases as applying to other liquids behaving as do most true vegetable, animal and mineral oils.

In this application, a nonmetallic mineral is meant minerals of the kind not primarily used for the production of a metal. For example, some clay-like bentonites contain aluminium and yet are considered as nonmetallic minerals. By "composition product" is meant an artificial product composed of a mixture of substances bound together to form a solid or semi-solid complex mass. The hardening or treating agent referred to above is used to give the desired amount of "setting". It may be a chemical such as ozone which oxidizes and dries the oily matter, or heat, or pressure, or like agent. A combination of such agents may be used. By "heavy petroleum" is meant petroleum which has a specific gravity of over thirty degrees. The process, for example, is quite suitable for oils with a specific gravity of about twenty. By "impregnation" is meant the process of intimately mixing a solid substance with another so as to form close contact between the surface of the solid with the other. The contact may extend to actual penetration or may even be indirect as when the solid substance is first treated or coated with a third substance. By "residual oil" is meant a residue or substance which is residual to a process wherein an oily or tar-like substance is treated for separation of some fraction or part therefrom. By "fibrous structure" is meant a product wherein individual particles have one dimension considerably in excess of another, thus yielding a form much like the common vegetable or animal fibre. Rigid nonporous acicular crystals are thus not included in this classification. This fibre may be used in particles of small size, or as agglomerations of the same like a matting or as threads or even a woven substance. For example, a clay-like substance may be extruded through small openings and, if desired, hardened thereafter. In this way, threads or fibers are produced which may be matted and rolled together and mixed with other materials. When properly hardened, a fibrous structure may be woven. Such fibrous structure may also be made up of other forms of natural and synthetic fibers and used for forming the product. By "diametrical dimension" is meant the diameter of the smallest imaginary sphere which could circumscribe the particle itself. Substances composed mainly of particles having a diametrical dimension are considered for purposes of this specification as being highly dispersed. By "extender" is meant a filler which increases the spread or usefulness of the oil. This expression is comonly used as applied to paints and like materials. The extender may, for example, be a clay-like product with dimensions less than one two-thousandths of an inch in size, or finely divided carbon may be used for this purpose.

It can readily be seen from the description of the process that the composition product may be used by itself or worked up with other parts and used therewith, for example as a filler between two papers, cloth or other sheets. It might likewise be impressed into a cloth or other fibrous textile. I do not bind myself as to the exact method of applying or using the composition product because of the larger number of possible ways of using it, nor do I limit myself as to the exact descriptions of the dispersed adsorptive mineral used, nor the process of applying it to the oily or equivalent substance. I intend that the invention shall apply to that class of substances and the process of operation which can be economically worked up into a composition product of value.

I recognize that there are some oils and some fillers and extenders that are not suited for forming composition of matter which is the subject hereof and that experimentation may be required to determine just which oils and what fillers, extenders and other parts may be required. In general I prefer that the oils used should be those which are commonly considered as waste products or those, the recovery of which is extensive, as regards the value of the recovered oil. Similarly it is required that the permissible components, such as alcohol, be determined by experimentation for each set of conditions.

I claim:—

1. The process which comprises contacting oil containing impurities with an adsorptive nonmetallic mineral, adsorbing impurities of the oil by the contacting mineral, separating purified oil from said mineral so that the mineral is obtained in association with residual oil and selectively adsorbed substances which were of impurities of the oil and some of which may be set or hardened with adsorbed impurities and adhering residual oil, mixing the said mineral containing residual oil and said impurities with a filler and applying a hardening agent to form a composition product.

2. The process of manufacturing a composition product which comprises mixing a highly dispersed adsorptive mineral, oil, and a filler and applying a drying agent and wherein the mineral has been previously used to remove impurities from oil and is possessed of these impurities at the time of mixing and a portion of the impurities of which act with the drying agent to set or harden the mass.

3. The process of manufacturing a composition product which comprises mixing a highly dispersed adsorptive agent comprised largely of particles substantially less than about one two-thousandths of an inch in size and possessed of matter adsorbed from oil in purifying the same and which matter may be set with oil, oil which may be set with a drying agent, a filler and a porous fibrous material and applying a drying agent to such mixture and forcing portions of the adsorptive agent into pores of the fibrous material to set the particles therewithin and with one another to form a somewhat rigid mass.

4. The process which comprises mixing highly dispersed adsorptive nonmetallic mineral with a heavy petroleum and adsorbing impurities from oil by means of the dispersing mineral, concentrating the mineral with respect to said oil to produce a solid or near solid mass containing the same residual oil, mineral and adsorbed impurities derived from the oil which impurities may be set, mixing said mass with a filler and oxidizing oils and impurities of the mass to make them set and forming a homogeneous solid compound that is slightly viscous at elevated temperatures by application of heat to the mixture.

5. The process which comprises treating a residual oil and adsorptive mineral of particles of less than about one two-thousandths of an inch in size with adsorbed impurities from the oil which has been purified and residual thereto with steam, removing volatile matter of the oil while retaining those of the impurities and heavier portions of the oil which may be set with oil on heating and treating the resulting mass with heat and to set the mass and harden it.

6. The process which comprises treating an oil with an adsorptive nonmetallic mineral which may be readily sheared and forced into pores of a fibrous material, causing colloidal substance to be deposited into said mineral, separating said mineral, deposited substance, and a portion of said oil from other portions of oil, and treating said separated mineral with a hardening agent while applying it to a porous fibrous material and applying heat and pressure thereto to form a composition product.

7. The process which comprises treating a mixture of residual oil and finely divided nonmetallic mineral of contact purification of oil which is associated with residual oil and impurities adsorbed by the mineral with a solvent and dissolving portions of the residual oil, separating said solvent and dissolved substance from said mixture and treating the resulting mixture with a hardening agent to set residual oil, impurities adsorbed by the mineral and closely incorporated therewith by adsorption and the mineral into a firm mass and while applying the mass to a porous surface the pores of which will receive portions of the mineral which is set therewithin.

8. The process which comprises treating a mixture of residual oil and finely divided nonmetallic mineral of contact purification of oil which is associated with residual oil and impurities adsorbed by the mineral with a solvent and dissolving portions of the residual oil, separating said solvent and dissolved substance from said mixture and treating the resulting mixture with a hardening agent to set residual oil, impurities adsorbed by the mineral and closely incorporated therewith by adsorption and the mineral into a firm mass and while applying the mass to a porous surface the pores of which will receive portions of the mineral which is set therewithin, and separating a dissolved substance from the solvent and recovering the solvent and reusing it to dissolve other oil from subsequent portions of mineral.

9. The process which comprises mixing a liquid containing solid components with a highly dispersed nonmetallic adsorptive mineral, causing supersaturation of a solid component of said liquid to precipitate the solid component from the liquid in association with the mineral and about the particles thereof, and simultaneously separating portions of said component and said nonmetallic mineral from liquid from which the solid component is derived and subsequently separating the mineral from the component.

10. The method of forming a composition product which comprises treating a filter cake containing residual oil, an adsorptive mineral purifying agent which may be readily sheared and adsorbed impurities, with a small amount of wash liquid which is miscible with the oil and which contains ingredients which may be set in a manner to prevent appreciable contamination of filtrate while displacing appreciable portions of the oil from the cake and causing wash liquid to form a part of a composition product by selecting the oil and wash liquid so that the resulting mass may be set by a hardening agent and by applying such an agent thereto.

11. A composition product comprising a binder of residual oil, a fibrous structure impregnated with said residual oil and an extender comprising inorganic particles of a diametrical dimension of less than about one two-thousandth of an inch, which extender is dispersed throughout the voids in approximate uniformity and possessed of matter adsorbed in the purification of oil and which matter may be set or hardened.

12. A composition product which comprises a binder of residual oil which may be oxidized and set, a highly dispersed colloidal clay and a porous material, the component parts being closely contacted and incorporated to shear the clay and force it into pores of the material whereat it has been set by action of an oxidizing agent.

13. A composition product which comprises a binder of residual oil treated that it may be hardened by application of heat agent, a highly dispersed colloidal clay possessed of adsorptive properties and which may be readily sheared by pressure and a fibrous porous material, the component parts being closely contacted by means of pressure and heat and wherein the particles of the clay have so been sheared and forced into pores of the material and into contact with one another and there set.

14. The process which comprises contacting oil containing adsorbable impurities with an adsorptive nonmetallic mineral which may be readily sheared and dispersed, promoting adsorption of a portion of the impurities by the mineral, separating portions of mineral with adsorbed impurities and a portion of oil from portions of contacting oil so purified, contacting the so separated mineral, portions of impurities and portions of associated oil with a porous substance the pore size of which will permit entrance and impregnation by the mineral and associated oil and hardening the impregnated substance by applying an oxidizing agent, heat and pressure and volatilizing portions of the oil and wherein impurities adsorbed in purifying the oil are set with the oxidized oil.

15. The process which comprises treating a residual oil and easily dispersable adsorptive mineral mixture with steam to remove volatile matter therefrom, contacting the residual mass of lowered oil content but possessed of adsorbed impurities derived from the oil and which impurities may be set and hardened with a porous substance and simultaneously applying an oxidizing agent and heat and pressure to promote shearing of the mineral and entrance into the pores of the porous substance and so hardening and setting the resulting impregnated composition of matter.

16. The process of simultaneously purifying oil and forming a mass which may be set as a part of a composition product and utilizing the mass which comprises contacting a highly dispersed adsorptive mineral with an oil, adsorbing impurities of the oil on the mineral and separating purified oil from a mass containing residual oil, washing out portions of residual oil while retaining other portions and adsorbed impurities, treating the mass containing residual oil, used mineral and impurities with a hardening agent while pressing the mineral into the pores of a porous fibrous material and applying heat so as to set the mass and form a composition product substantially as described.

17. A composition product comprised of a highly dispersable non-metallic mineral and matter adsorbed thereby and derived from purification of oil by contact therewith and which matter may be set, wash liquid and a rubber-like substance which have been selected, incorporated and hardened with a fibrous material so as to form a somewhat flexible composition product.

18. A composition of matter which is formed by mixing an oil which may be oxidized to set the same with a highly dispersable adsorptive non-metallic mineral and mixed with a fibrous material containing pores adapted to receive and contain the sheared particles of the mineral and wherein the parts are integral having been incorporated by applying pressure and heat so as to force the particles within the pores and set the mass to form a fairly rigid but somewhat flexible product.

19. A composition of matter comprised of a readily dispersable non-metallic mineral adapted to be sheared to form highly dispersed particles and forced into the pores of a fibrous material, a fibrous material with pores adapted to receive sheared particles of the mineral, an oil which may be readily set by an oxidizing agent, an oxidizing agent for setting the oil and wherein the oil and the mineral are contained between two sheets of the fibrous material with an intimacy equivalent to that obtained when they are forced together under pressure during the application of heat and with a resulting close incorporation of the particles between the sheets and extending into the pores of the fibres of the sheets and which product has been hardened to give a nearly rigid mass with some flexibility.

20. A composition of matter which is sheet like and somewhat flexible and about as illustrated in Fig. 3 and which is comprised of an originally flexible central member of woven or matted porous fibrous material interstices and pores of which contain forced-in highly dispersed adsorptive non-metallic mineral and set residual oil and adsorbed impurities resulting from contact purification of an oil and in which composition the two surfaces of the central member are faced with set mineral and residual matter thereof.

JUSTIN F. WAIT.